United States Patent
Kim et al.

(10) Patent No.: US 10,657,665 B2
(45) Date of Patent: May 19, 2020

(54) APPARATUS AND METHOD FOR GENERATING THREE-DIMENSIONAL INFORMATION

(71) Applicant: ELECTRONICS AND TELECOMMUNICATIONS RESEARCH INSTITUTE, Daejeon (KR)

(72) Inventors: Jae Hean Kim, Sejong (KR); Hyun Kang, Daejeon (KR); Chang Joon Park, Daejeon (KR); Jin Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 233 days.

(21) Appl. No.: 15/833,999

(22) Filed: Dec. 6, 2017

(65) Prior Publication Data
US 2018/0158205 A1   Jun. 7, 2018

(30) Foreign Application Priority Data

Dec. 7, 2016   (KR) .................. 10-2016-0165987
Nov. 22, 2017  (KR) .................. 10-2017-0156689

(51) Int. Cl.
| G06T 7/514 | (2017.01) |
| G06T 7/73 | (2017.01) |
| G06T 7/557 | (2017.01) |
| G06T 7/521 | (2017.01) |

(52) U.S. Cl.
CPC .............. *G06T 7/514* (2017.01); *G06T 7/521* (2017.01); *G06T 7/557* (2017.01); *G06T 7/73* (2017.01); *G06T 2207/10004* (2013.01); *G06T 2207/10028* (2013.01); *G06T 2207/20068* (2013.01)

(58) Field of Classification Search
CPC combination set(s) only.
See application file for complete search history.

(56) References Cited

U.S. PATENT DOCUMENTS

| 7,106,898 | B2 | 9/2006 | Bouguet et al. |
| 7,241,045 | B2 * | 7/2007 | Skalli ...................... A61B 6/02 378/164 |
| 7,342,669 | B2 | 3/2008 | Kawasaki et al. |

(Continued)

*Primary Examiner* — Zhiyu Lu

(57) ABSTRACT

A disclosure of the present invention is related to an apparatus and a method for generating three-dimensional information. The apparatus for generating three-dimensional information may include a light source providing light to an object to be reconstructed in three-dimensional information, a coordinate reference mechanism unit provided between the light source and the object and having a plurality of protrusions reflecting the light; a camera unit outputting an image capturing the coordinate reference mechanism unit and the object simultaneously; and a three-dimensional information processing unit generating the three-dimensional information of the object by identifying a projection plane formed by the light and using the projection plane, considering a relationship between a plurality of actual protrusion reflection points at which the light is reflected by the plurality of protrusions respectively and a plurality of protrusion reflection points displayed in the image.

17 Claims, 5 Drawing Sheets

(56) References Cited

U.S. PATENT DOCUMENTS

| | | | | |
|---|---|---|---|---|
| 7,477,926 B2* | 1/2009 | McCombs | ............. | A61B 34/74 |
| | | | | 600/407 |
| 8,068,648 B2* | 11/2011 | DiSilvestro | ............. | G06K 9/32 |
| | | | | 382/128 |
| 8,104,958 B2* | 1/2012 | Weiser | ................... | A61B 6/583 |
| | | | | 378/162 |
| 9,519,976 B1* | 12/2016 | Saltzman | ............. | H04N 13/246 |
| 2001/0039421 A1* | 11/2001 | Heilbrun | ................. | A61B 5/06 |
| | | | | 606/130 |
| 2004/0202364 A1* | 10/2004 | Otani | ................... | G01B 21/042 |
| | | | | 382/154 |
| 2004/0234122 A1* | 11/2004 | Kochi | ................... | G01B 11/24 |
| | | | | 382/154 |
| 2005/0180623 A1* | 8/2005 | Mueller | ................ | G01B 11/00 |
| | | | | 382/154 |
| 2009/0080036 A1* | 3/2009 | Paterson | ............ | G01B 11/2518 |
| | | | | 358/474 |
| 2012/0256916 A1* | 10/2012 | Kitamura | .............. | G01B 11/24 |
| | | | | 345/419 |
| 2013/0053702 A1* | 2/2013 | Pfeiffer | ................ | A61B 5/0064 |
| | | | | 600/476 |
| 2013/0329012 A1* | 12/2013 | Bartos | ................ | G01B 21/042 |
| | | | | 348/46 |
| 2014/0285655 A1 | 9/2014 | Son et al. | | |
| 2015/0168135 A1 | 6/2015 | Kim et al. | | |
| 2017/0172382 A1* | 6/2017 | Nir | ........................ | A61B 34/20 |
| 2017/0191822 A1* | 7/2017 | Becker | ................ | H05K 999/99 |
| 2018/0322647 A1* | 11/2018 | Harrington | ............. | G06T 17/00 |

* cited by examiner

APPARATUS AND METHOD FOR GENERATING THREE-DIMENSIONAL INFORMATION

The present application claims priority to Korean Patent Application No. 10-2016-0165987, filed Dec. 7, 2016 and Korean Patent Application No. 10-2017-0156689, filed Nov. 22, 2017, the entire contents of which is incorporated herein for all purposes by this reference.

BACKGROUND OF THE INVENTION

Field of the Invention

The present disclosure relates generally to a technique for reconstructing three-dimensional information of an object and, more particularly, to a method and an apparatus for generating a three-dimensional coordinate point of an object.

Description of the Related Art

Generally, a three-dimensional scanner for collecting three-dimensional information is divided into a contact type device and a non-contact type device. The non-contact type device collects light reflected or scattered from an object to be scanned, and performs image processing or computes a distance from each area to be measured, thereby determining a three-dimensional shape of the object to be scanned.

One of scanning methods of the non-contact type three-dimensional scanner is a position sensitive device (PSD) method. In general, a scanner of the PSD method includes a light emitting unit that emits a laser or an infrared ray, and a light receiving sensor that receives the light reflected from the object after being emitted from the light emitting unit, wherein the scanner is configured to compute the distance from a direction of the reflected light to an area of the object where the reflection is performed, and to repeat such computation, whereby it is possible to determine the overall three-dimensional shape of the object.

Generally, a three-dimensional scanning technique using the non-contact type three-dimensional scanner or the like has been used only for a specialized field such as a reverse design and a quality management in the industry. However, with the recent spread of three-dimensional printers, there has been an increasing interest in three-dimensional scanning by a general user in fields such as education, medical care, entertainment, distribution, and the like.

SUMMARY OF THE INVENTION

In accordance with market trends, there has been a need for a technology in which not only specialized person but also a general user can easily perform three-dimensional scanning without using complicated equipment and can generate three-dimensional information of an object more easily.

It is an object of the present invention to provide an apparatus and a method for generating three-dimensional information in which three-dimensional scanning is easily performed by a general user using a simple mechanism unit without having complicated or large-sized equipment.

Another object of the present invention is to provide an apparatus and a method for generating three-dimensional information in which reference information of three-dimensional scanning is set using a simple mechanism unit and three-dimensional scanning is performed through relatively simple computations without correcting the mechanism unit.

The technical objects to be achieved by the present disclosure are not limited to the technical matters mentioned above, and those skilled in the art will appreciate that other technical subjects which are not mentioned are clearly understood from the following description.

According to an aspect of the present disclosure, an apparatus for generating three-dimensional information may be provided. The apparatus may include a light source providing light to an object to be reconstructed in three-dimensional information; a coordinate reference mechanism unit provided between the light source and the object and having a plurality of protrusions reflecting the light; a camera unit outputting an image capturing the coordinate reference mechanism unit and the object simultaneously; and a three-dimensional information processing unit generating three-dimensional information of the object by identifying a projection plane formed by the light and using the projection plane, considering a relationship between a plurality of actual protrusion reflection points at which the light is reflected by the plurality of protrusions respectively and a plurality of protrusion reflection points displayed in the image.

According to an aspect of the present disclosure, a method for generating three-dimensional information may be provided. The method may include acquiring an image by capturing a coordinate reference mechanism unit provided between a light source and an object to be reconstructed in three-dimensional information and having a plurality of protrusions reflecting light provided from the light source, and the object simultaneously; identifying coordinates of a plurality of protrusion reflection points at which the light is reflected by the plurality of protrusions in the image; and generating the three-dimensional information of the object by identifying a projection plane formed by the light and using the projection plane, considering a relationship between the plurality of protrusion reflection points in the image and a plurality of actual protrusion reflection points actually reflected by the plurality of protrusions.

The features briefly summarized above for this disclosure are only exemplary aspects of the detailed description of the disclosure which follow, and are not intended to limit the scope of the disclosure.

According to the present disclosure, it is possible to provide an apparatus and a method for generating three-dimensional information by using a simple mechanism unit without having complicated or large-sized equipment.

Further, according to the present disclosure, it is possible to provide an apparatus and a method for generating three-dimensional information in which three-dimensional scanning may be easily performed by a general user using a simple mechanical unit.

In addition, according to the present disclosure, it is possible to provide an apparatus and a method for generating three-dimensional information in which reference information of three-dimensional scanning is set using a simple mechanism unit and three-dimensional scanning is performed through relatively simple computations without correcting the mechanical unit.

The effects obtainable in the present disclosure are not limited to the effects mentioned above, and other effects not mentioned can be clearly understood by those skilled in the art from the description described below.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
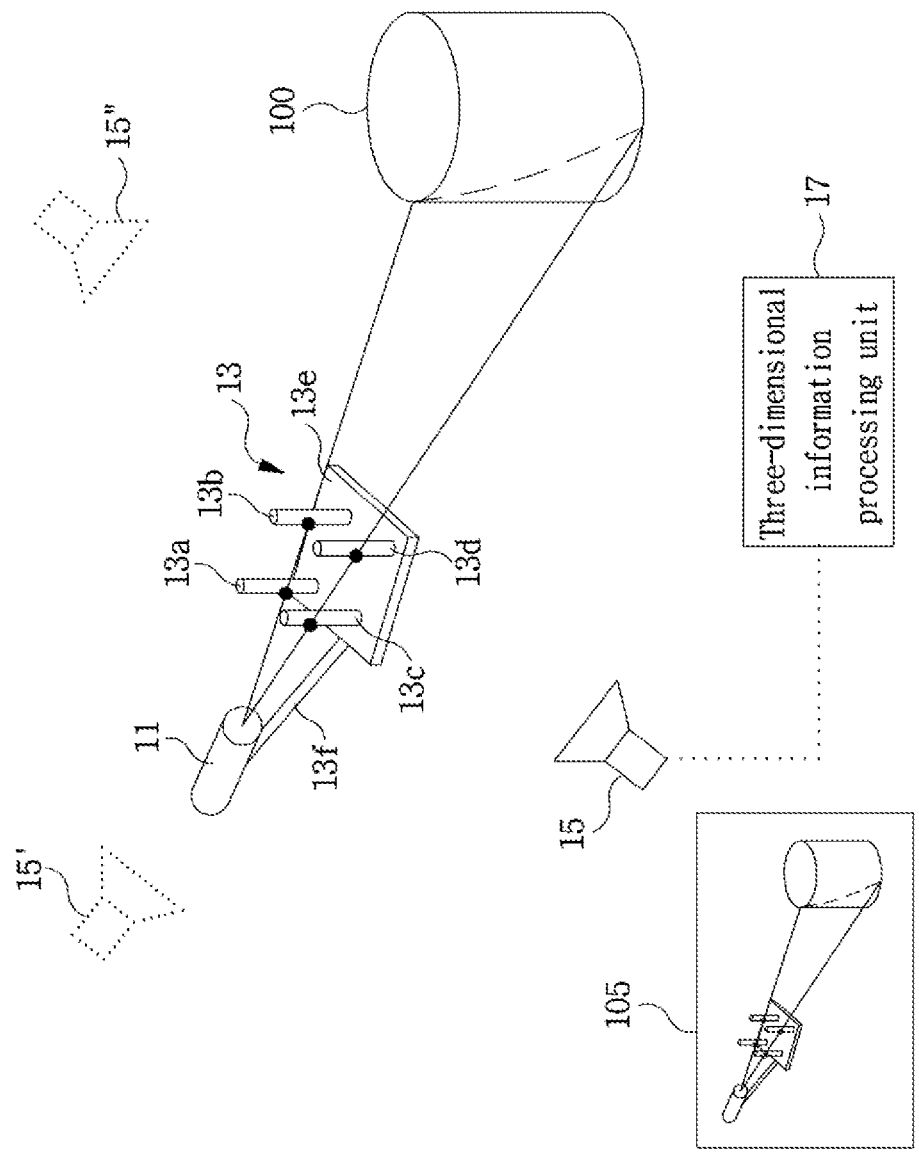
FIG. 1 is a block diagram showing a configuration of an apparatus for generating three-dimensional information according to an embodiment of the present disclosure.

Hereinbelow, embodiments of the present invention will be described in detail so that those skilled in the art can easily carry out the present invention referring to the accompanying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "connected" to another element, it is understood to include not only a direct connection relationship but also an indirect connection relationship. Also, when an element is referred to as "containing" or "having" another element, it means not only excluding another element but also further including another element.

In the present disclosure, the terms first, second, and so on are used only for the purpose of distinguishing one element from another, and do not limit the order or importance of the elements unless specifically mentioned. Thus, within the scope of this disclosure, the first component in one embodiment may be referred to as a second component in another embodiment, and similarly a second component in one embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in one embodiment are also included within the scope of this disclosure. Also, embodiments that include other components in addition to the components described in the various embodiments are also included in the scope of the present disclosure.

Hereinafter, embodiments of the present disclosure will be described with reference to the accompanying drawings.

FIG. 1 is a block diagram showing a configuration of an apparatus for generating three-dimensional information according to an embodiment of the present disclosure.

Referring to FIG. 1, the apparatus for generating three-dimensional information may include a light source 11, a coordinate reference mechanism unit 13, a camera unit 15, and a three-dimensional information processing unit 17.

The light source 11 may be a device for providing light to an object 100 to be reconstructed in three-dimensional information. For example, the light source 11 may include at least one line laser device that outputs line laser light, and at least one pattern laser device that outputs laser light of a predefined pattern. Further, the light source 11 may be provided to output two or more laser lights at the same time.

The coordinate reference mechanism unit 13 may be provided between the light source 11 and the object 100 and have a plurality of protrusions 13a, 13b, 13c, and 13d reflecting the light provided from the light source 11. The light reflected through the plurality of protrusions 13a, 13b, 13c, and 13d may be used to set a reference of three-dimensional coordinates. Accordingly, the plurality of protrusions 13a, 13b, 13c, and 13d may have positions and arrangements determined in accordance with a coordinate setting method.

Also, the coordinate reference mechanism unit 13 may further include a fixed plate 13e in which the plurality of protrusions 13a, 13b, 13c, and 13d are fixed to cause the positions and arrangements of the plurality of protrusions 13a, 13b, 13c, and 13d to be maintained.

Further, the coordinate reference mechanism unit 13 may further include a fixing arm 13f that holds the fixed plate 13e to the light source 11 to cause the plurality of protrusions 13a, 13b, 13c, and 13d to be maintained at a predetermined position between the light source 11 and the object 100.

The camera unit 15 may include a lens-array and an image sensor, and may be a device for generating and providing a two-dimensional image (or picture). In particular, the camera unit 15 captures an image (or picture) 105 including the coordinate reference mechanism unit 13 and the object 100, and outputs the captured image (or picture) 105 to the three-dimensional information processing unit 17.

Further, the image (or picture) 105 including the coordinate reference mechanism unit 13 and the object 100 may be basically needed to generate the three-dimensional information of the object 100. It is requested to capture the object in directions or positions different from one another, in order to more accurately generate three-dimensional information about the object 100. Therefore, the camera units 15, 15', and 15" acquire a first image (or picture) captured from a first camera unit 15 provided in a first direction, a second image (or picture) captured from a second camera unit 15' provided in a second direction, and a third image (or picture) captured from a third camera unit 15" provided in a third direction to be provided to the three-dimensional information processing unit 17.

The first camera unit 15, the second camera unit 15', and the third camera unit 15" may be the same camera device arranged at positions different from one another.

As another example, the first camera unit 15, the second camera unit 15', and the third camera unit 15" may be different camera devices, in which the first image (or picture), the second image (or picture), the third image (or picture), and the like which are captured at the same time may be provided to the three-dimensional information processing unit 17, respectively.

Further, the camera unit 15, 15', and 15" may capture the light source 11, the coordinate reference mechanism unit 13, and the object 100, to output a digital image. For example, the camera unit 15, 15', and 15" are compact camera devices that are easy to carry and may include a conventional digital camera device, a camera device provided in a mobile device, an action cam (Sports & Action Cameras), and the like.

The three-dimensional information processing unit 17 may include a storage medium storing program codes capable of executing a program for generating three-dimensional information, and an electronic device having at least one processor for executing the program code. The three-dimensional information processing unit 17 may be provided in a camera device having the camera units 15, 15', and 15", or provided in a separate electronic device.

In particular, the three-dimensional information processing unit 17 may set three-dimensional reference coordinates based on a plurality of protrusion reflection points at which the light is reflected by the plurality of protrusions, in the image (or picture) 105 including the coordinate reference mechanism unit 13 and the object 100, and generate three-dimensional information of the object based on the three-dimensional reference coordinates.

Hereinafter, the operation of the three-dimensional information processing unit 17 to generate three-dimensional information of an object will be described in detail.

Figure 2:
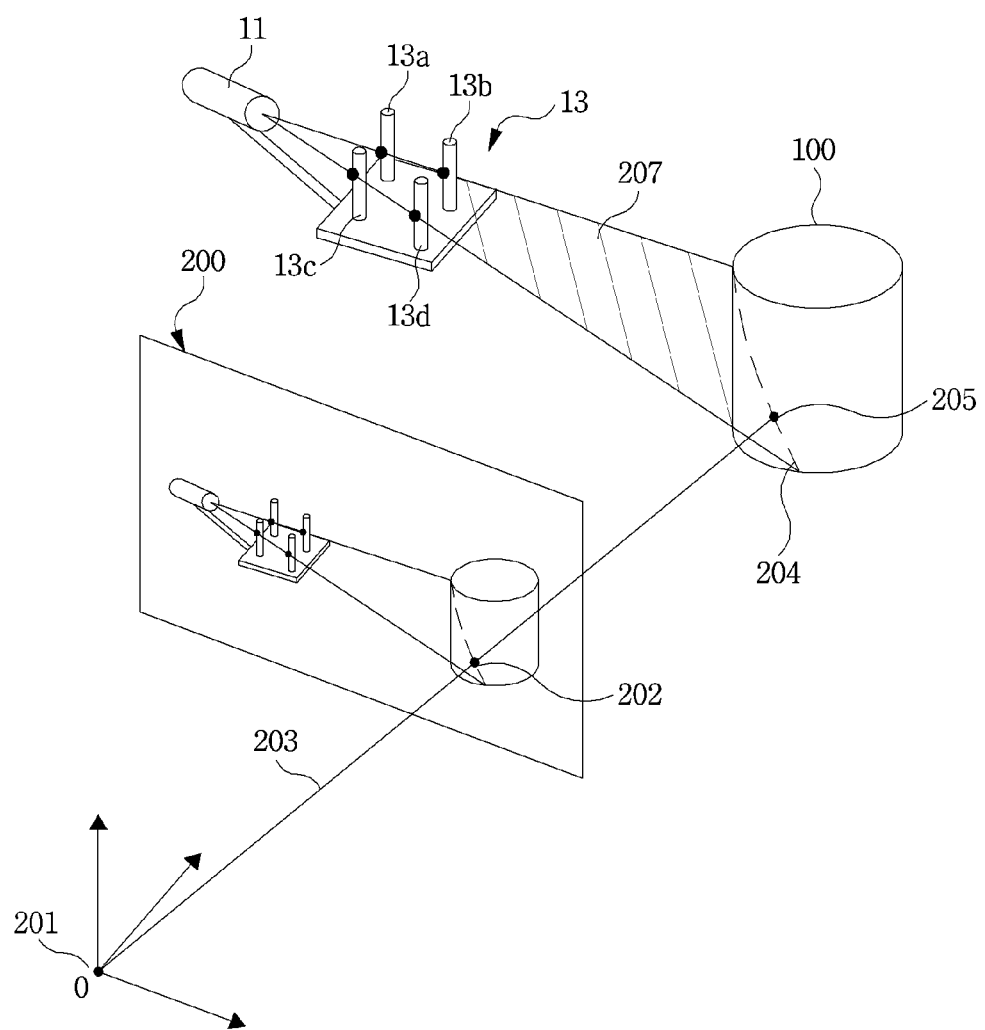
FIG. 2 is a diagram illustrating a relationship between an image captured by an apparatus for generating three-dimensional information according to an embodiment of the present disclosure and a projection plane formed by a coordinate reference mechanism unit and a light source.

FIG. 2 is a diagram illustrating a relationship between some components provided in the apparatus for generating three-dimensional information according to an embodiment of the present disclosure, and an image captured by a camera provided in the apparatus for generating three-dimensional information.

Based on a pinhole camera model, it is possible to extend a straight line 203 (hereinafter referred to as a 'projection line') passing through an arbitrary point 202 through which a line laser passes on an image 200, with respect with an origin (O) 201 of a camera coordinate system.

On the other hand, the light emitted by the line laser forms a projection plane 207, and a projection curve 204 of the line laser may be formed along an outer region of the object 100 as the projection plane 207 reaches the object 100.

An intersection point 205 between the extended straight line 203 and the projection plane 207 can be identified and this intersection point 205 can be determined as a point on a surface of the object 100.

Based on this, the three-dimensional information processing unit 17 can identify the points through which the line lasers pass on the image 200 and detect the coordinates corresponding to the points on the surface of the object by identifying the intersection points corresponding to these points.

For example, the three-dimensional information processing unit 17 defines the arbitrary point 202 through which a line laser passes on an image 200 as [u v], and computes a direction vector of the straight line 203 passing through the arbitrary point 202 via a computation of the following Equation 1.

$$d \cong K^{-1}[u\, v\, 1]^T$$ [Equation 1]

Herein K is a camera internal parameter matrix defined in a field of computer vision, and the camera internal parameter matrix can be preset by a general camera calibration method.

Further, the value of the arbitrary point 202 through which the line laser passes on the image 200 can be corrected by reflecting a degree of distortion of lens provided in the camera unit.

On the other hand, the three-dimensional information processing unit 17 can compute the projection plane 207 formed by the light emitted by the line laser from the image 200 based on the camera coordinate system.

Hereinafter, the operation of the three-dimensional information processing unit 17 to compute the projection plane 207 will be described in detail.

Figure 3:
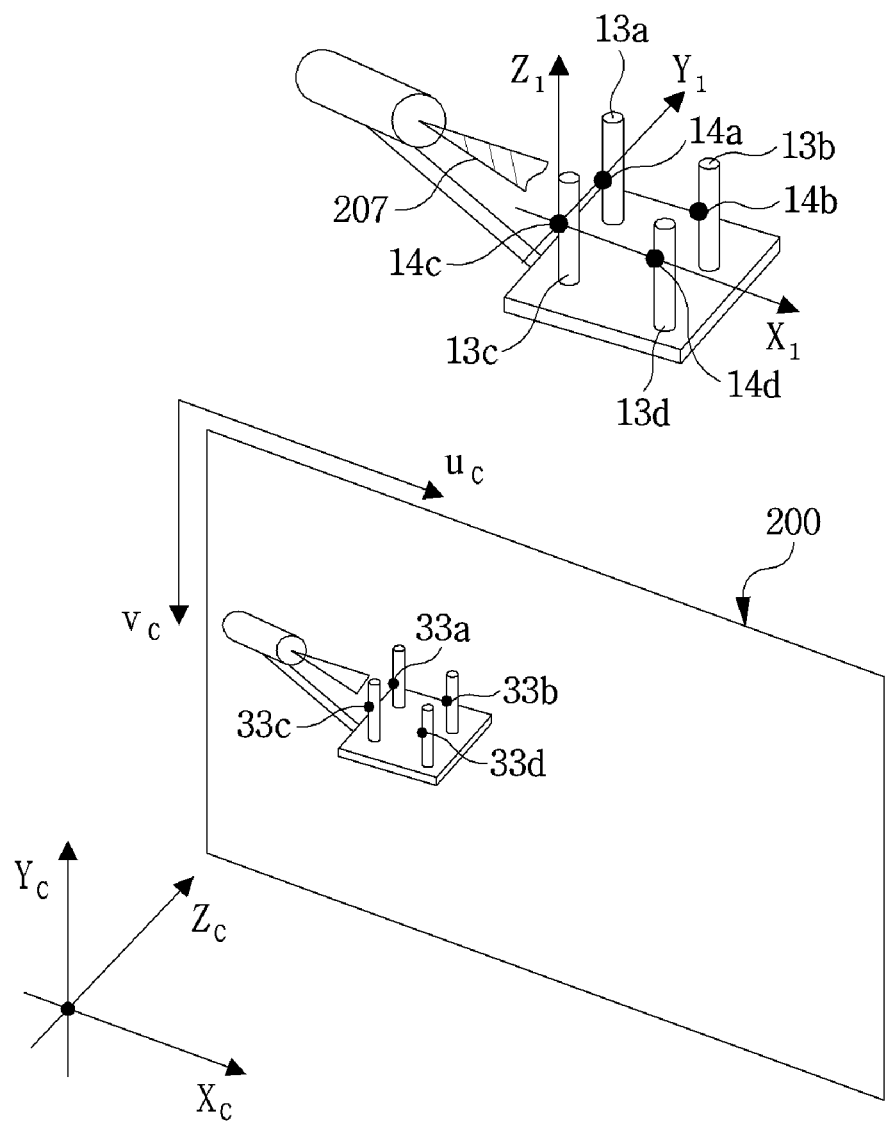
FIG. 3 is a diagram illustrating a relationship between a plurality of actual protrusion reflection points at which light generated by an apparatus for generating three-dimensional information according to an embodiment of the present disclosure is reflected, and a plurality of protrusion reflection points displayed in the image.

FIG. 3 is a diagram illustrating a relationship between a plurality of actual protrusion reflection points at which light generated by an apparatus for generating three-dimensional information according to an embodiment of the present disclosure is reflected, and a plurality of protrusion reflection points displayed in the image.

The laser light output from the light source 11 may form the projection plane 207. The projection plane 207 formed by the laser light may use protrusion reflection points 14a, 14b, 14c, and 14d reflected by the plurality of protrusions 13a, 13b, 13c, and 13d provided in the coordinate reference mechanism unit 13, in order to precisely confirm from which position the laser light is generated and in which direction the laser light is projected.

The three-dimensional information processing unit 17 may compute the projection plane 207 considering a relationship between actual positions of the protrusion reflection points 14a, 14b, 14c and 14d reflected by the plurality of protrusions 13a, 13b, 13c and 13d, and protrusion reflection points 33a, 33b, 33c, and 33d extracted from the image 200.

For example, the three-dimensional information processing unit 17 sets a virtual coordinate system $X_1$, $Y_1$, and $Z_1$ considering an actual space. The origin is set to one of the protrusion reflection points 14a, 14b, 14c, and 14d reflected by the plurality of protrusions 13a, 13b, 13c, and 13d, and an X-axis and a Y-axis are positioned on a plane formed by the remaining points. Accordingly, the three-dimensional information processing unit 17 may acquire a three-dimensional coordinate ($[X_i\, Y_i\, 0]$, i=0, 1, ..., 3) of the protrusion reflection point, by reflecting a structure of the coordinate reference mechanism unit 13.

In addition, the three-dimensional information processing unit 17 may extract the protrusion reflection points 33a, 33b, 33c, and 3d reflected respectively at the plurality of protrusions 13a, 13b, 13c, and 13d from the image 200, and set a 2D coordinate of this point as $[u_i\, v_i]$ (i =0, 1, ..., 3) for a coordinate system $u_C$, $v_C$.

In the apparatus for generating three-dimensional information according to the embodiment of the present disclosure, a point $[x_i\, y_i\, 1]^T (K^{-1} [u_i\, v_i\, 1]^T)$ on the normalized image 200 plane can be expressed by the following equation 2.

$$[x_i\, y_i\, 1]^T = H[X_i\, Y_i\, 1]^T$$ [Equation 2]

Herein, H can be calculated from $[X_i\, Y_i\, 0]$ (i=0, 1, ..., 3) and $[u_i\, v_i]$ (i=0, 1, ..., 3) as a homography 3×3 matrix.

At this time, H can be expressed by the following Equation 3 using a rotation matrix ($R=[r_0\, r_1\, r_2]$) and a translation vector (t) between the two coordinate systems $X_1\, Y_1\, Z_1$ and $X_C\, Y_C\, Z_C$.

$$H = [r_0\, r_1\, t_3]$$ [Equation 3]

The three-dimensional information processing unit 17 can compute the rotation matrix ($R=[r_0\, r_1\, r_2]$) and the translation vector (t) from H obtained by the above Equation 3. Further, the three-dimensional information processing unit 17 can improve the accuracy of the rotation matrix ($R=[r_0\, r_1\, r_2]$) and the translation vector (t) by a nonlinear optimization method through a cost function of the following Equation 4 and by setting the rotation matrix ($R=[r_0\ r_1\ r_2]$) and the translation vector (t) obtained above as initial values.

$$\sum_{i=0}^{3} \|[x_i y_i]^T - \pi([r_0 r_1 t][X_i Y_i 1]^T)\|^2 \quad \text{[Equation 4]}$$

Herein $\pi([a\ b\ c]^T)$ is a function defined as $[a/c\ b/c]^T$.

Supposing that $r_2=[r_{02}\ r_{12}\ r_{22}]^T$ and $t=[t_x\ t_y\ t_z]$, an $X_1$-$Y_1$ plane equation can be calculated by the following Equation 5 from the rotation matrix ($R=[r_0\ r_1\ r_2]$) and the translation vector (t).

$$r_{02}(x-t_x)+r_{12}(y-t_y)+r_{22}(z-t_z)=0 \quad \text{[Equation 5]}$$

Since the protrusion reflection points 14a, 14b, 14c, and 14d are generated by causing the plurality of protrusions 13a, 13b, 13c, and 13d to be encountered on the projection plane 207, the plane expression of the above Equation 5 corresponds to the expression of the projection plane 207.

Thus, the three-dimensional information processing unit 17 uses the Equation 5 corresponding to the expression of the projection plane 207 and the Equation 1 representing the direction vector of the projection line 203 passing through the arbitrary point 202, to compute an intersection point 205 between the projection line 203 and the projection plane 207. It is possible to obtain a set of three-dimensional points on the projection curve 204 by performing this process for all the laser points projected on the image 200 of the projection curve 204 by the laser.

The three-dimensional information processing unit 17 repeatedly performs the operation of computing three-dimensional coordinates of the projection curve 204 with respect to the continuous image acquired while the laser light source is moving to cause the laser light to be irradiated on the object, thereby computing three-dimensional scan results representing a shape of the object.

Figure 4:
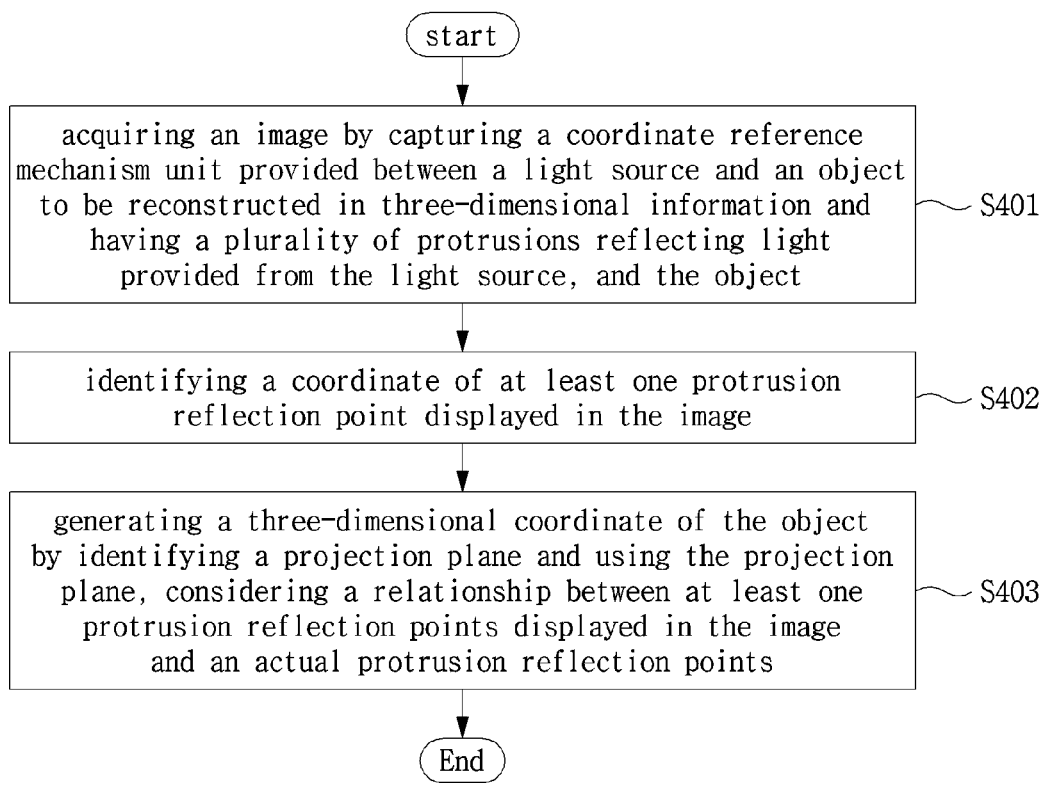
FIG. 4 is a flowchart showing procedures of a method for generating three-dimensional information according to an embodiment of the present disclosure.

FIG. 4 is a flowchart showing procedures of a method for generating three-dimensional information according to an embodiment of the present disclosure.

The method for generating three-dimensional information may be performed by the apparatus for generating three-dimensional information.

In step S401, the apparatus for generating three-dimensional information may acquire an image generated from a light source and an image obtained by capturing an object to be reconstructed in three-dimensional information. In this case, a coordinate reference mechanism including a plurality of protrusions reflecting the light provided by the light source may be provided between the light source and the object. Therefore, the acquired image may include light emitted by the light source, the coordinate reference mechanism unit, and the object, and may further include a projection plane formed by the light, and a plurality of protrusion reflection points reflected by the coordinate reference mechanism unit, and a projection plane line at which the projection plane is reflected by the object.

In step S402, the apparatus for generating three-dimensional information identifies a coordinate of at least one protrusion reflection point displayed in the image. For example, the apparatus for generating three-dimensional information may extract the protrusion reflection points 33a, 33b, 33c, and 33d displayed in the image, and set a 2D coordinate of this point as $[u_1\ v_1]$ (i=0, 1, . . . , 3) for a coordinate system $u_C, v_C$.

Next, in step S403, the apparatus for generating three-dimensional information identifies a relationship between at least one protrusion reflection point displayed in the image and actual protrusion reflection points, considering the design information of the actual protrusion. Then, the apparatus identifies the projection plane formed by the light considering the relationship between at least one protrusion reflection point displayed in the image and the actual protrusion reflection points, and generates the three-dimensional information using the projection plane.

For example, the apparatus for generating three-dimensional information sets a virtual coordinate system ($X_1$, $Y_1$, $Z_1$) in consideration of an actual space. Then, one point of the protrusion reflection points reflected by the plurality of protrusions 13a, 13b, 13c, and 13d is set as the origin, and the X axis and the Y axis are set to be located on the plane formed by the remaining points. Thus, the apparatus for generating three-dimensional information may acquire a three-dimensional coordinate ($[X_i\ Y_i 0]$ (i=0, 1, . . . , 3) by reflecting a structure of the coordinate reference mechanism unit 13.

In the method for generating three-dimensional information according to the embodiment of the present disclosure, a point $[x_i\ y_i\ 1]^T(K^{-1}[u_i\ v_i\ 1]^T)$ on the normalized image 200 plane can be expressed by the following equation 6.

$$[x_i y_i 1]^{T \approx H[X_i Y_i 1]^T} \quad \text{[Equation 6]}$$

Herein, H can be calculated from $[X_i\ Y_i\ 0]$ (i=0, 1, . . . , 3) and $[u_i\ v_i]$ (i=0, 1, . . . , 3) as a homography 3×3 matrix.

At this time, H can be expressed by the following equation 7 using a rotation matrix ($R=[r_0\ r_1\ r_2]$) and a translation vector (t) between the two coordinate systems $X_1\ Y_1\ Z_1$ and $X_C\ Y_C\ Z_C$.

$$H=[r_0 r_1 t_3] \quad \text{[Equation 7]}$$

The three-dimensional information processing unit 17 can compute the rotation matrix ($R=[r_0\ r_1\ r_2]$) and the translation vector (t) from H obtained by Equation 7. Further, the three-dimensional information processing unit 17 can improve the accuracy of the rotation matrix ($R=[r_0\ r_1\ r_2]$) and the translation vector (t) by a nonlinear optimization method through a cost function of the following Equation 8 and by setting the rotation matrix ($R=[r_0\ r_1\ r_2]$) and the translation vector (t) obtained above as initial values.

$$\sum_{i=0}^{3} \|[x_i y_i]^T - \pi([r_0 r_1 t][X_i Y_i 1]^T)\|^2 \quad \text{[Equation 8]}$$

Herein, $\pi([a\ b\ c]^T)$ is a function defined by $[a/c\ b/c]^T$.

Next, the apparatus for generating three-dimensional information can compute the projection plane 207 formed by the line laser based on the relationship information between the protrusion reflection point in the image and the actual protrusion reflection point. For example, assuming that $r_2=[r_{02}\ r_{12}\ r_{22}]^T$ and $t=[t_x\ t_y\ t_z]^T$, the apparatus for generating three-dimensional information may compute the $X_1$-$Y_1$ plane expression from the rotation matrix ($R=[r_0\ r_1\ r_2]$) and the translation vector (t). The $X_1$-$Y_1$ plane expression may be computed by the following Equation 9.

$$r_{02}(x-t_x)+r_{12}(y-t_y)+r_{22}(z-t_z)=0 \quad \text{[Equation 9]}$$

On the other hand, on the basis of a pinhole camera model, it is possible to extend a projection line 203 passing through the arbitrary point 202 through which the line laser passes in the image 200, with respect to the origin (O) 201 (see FIG. 2) of the camera coordinate system.

The light emitted by the line laser forms the projection plane 207, and a projection curve 204 of the line laser may be formed in the object 100 as the projection plane 207 reaches the object 100.

In step S403, the apparatus for generating three-dimensional information can identify an intersection point 205 between the projection line 203 and the projection plane 207 of the line laser. The intersection point 205 may be determined as a point on a surface of the object 100. Consequently, the three-dimensional information processing unit 17 indentifies the points through which the line laser passes on the image 200 and identifies the intersection point corresponding to the points, thereby detecting coordinates of three-dimensional points on the projection curve 204 corresponding to a point on the surface of the object.

For example, the apparatus for generating three-dimensional information may define the arbitrary point 202 through which the line laser passes on the image 200 as [u v], and compute a direction vector of the projection line 203 passing through the arbitrary point 202 via a computation of the following Equation 10.

$$d \simeq K^{-1}[uv1]^T \qquad \text{[Equation 10]}$$

Herein, K is a camera internal parameter matrix defined in a field of computer vision, and the camera internal parameter matrix can be preset by a general camera calibration method. Further, the value of the arbitrary point 202 through which the line laser passes on the image 200 can be corrected by reflecting a degree of distortion of a lens provided in the camera unit.

On the other hand, since the protrusion reflection points are generated by causing the plurality of protrusions 13a, 13b, 13c, and 13d to be encountered on the projection plane 207, the plane expression of the above Equation 9 coincides with the expression of the projection plane 207. Furthermore, the projection plane 207 can form the projection plane line 204. Thus, the apparatus for generating three-dimensional information may compute an intersection point 205 between the projection line 203 and the projection plane 207 using the Equation 9 corresponding to the expression of the projection plane 207 and the Equation 10 representing the direction vector of the projection line 203 passing through the arbitrary point 202.

According to the apparatus for generating three-dimensional information of an embodiment of the present disclosure, it is possible to configure the three-dimensional scanner, which is provided with only the simple coordinate reference mechanism unit mounted on the light source, the camera unit, and the three-dimensional information processing unit. As described above, since there is no need for a complicated mechanism to be installed outside, it can be advantageous for movement and maintenance. In particular, the camera unit and the three-dimensional information processing unit can be provided in a mobile device, and the three-dimensional scanner can be easily configured using the mobile device and the coordinate reference mechanism unit mounted on the light source.

Further, the apparatus for generating three-dimensional information according to an embodiment of the present invention may simplify correction and improve the degree of accuracy, whereby it may be easily used by an ordinary general person as well as an expert.

Figure 5:
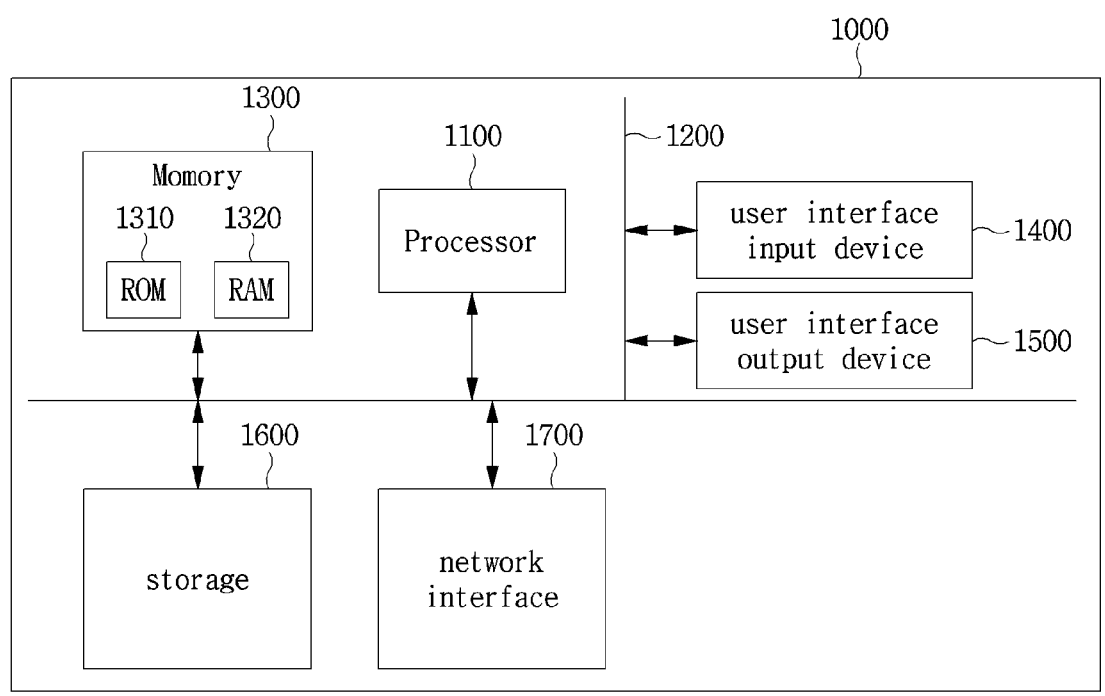
FIG. 5 is a block diagram illustrating a computing system that executes a method and an apparatus for generating three-dimensional information in accordance with an embodiment of the present disclosure.

FIG. 5 is a block diagram illustrating a computing system that executes a method and an apparatus for generating three-dimensional information in accordance with an embodiment of the present disclosure.

Referring to FIG. 5, a computing system 1000 includes at least one processor 1100, a memory 1300, a user interface input device 1400, a user interface output device 1500, a storage 1600, and a network interface 1700 which are connected via a bus 1200.

The processor 1100 may be a semiconductor device that performs processing on instructions stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Thus, the steps of a method or algorithm described in connection with the embodiments disclosed herein may be embodied directly in hardware, a software module, or a combination of two executed by the processor 1100. The software module may reside in a storage medium (e.g., memory 1300 and/or storage 1600) such as a RAM memory, a flash memory, a ROM memory, an EPROM memory, an EEPROM memory, a register, a hard disk, a removable disk, and CD-ROM. An exemplary storage medium is coupled to the processor 1100, which is capable of reading information from, and writing information to, the storage medium. Alternatively, the storage medium may be integral with the processor 1100. The processor and the storage medium may reside within an application specific integrated circuit (ASIC). The ASIC may reside within the user terminal. Alternatively, the processor and the storage medium may reside as discrete components in a user terminal.

Although the exemplary methods of this disclosure are represented by a series of steps for clarity of explanation, they are not intended to limit the order in which the steps are performed, and if necessary, each step may be performed simultaneously or in a different order. In order to implement the method according to the present disclosure, it is possible to include other steps to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. A case of hardware implementation may be performed by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like.

The scope of the present disclosure is to encompass software or machine-executable instructions (e.g., operating system, applications, firmware, instructions, and the like) by which operations according to method of various embodiments are executed on a device or a computer, and non-transitory computer-readable media executable on the device or the computer, on which such software or instructions are stored.

The invention claimed is:

1. An apparatus for generating three-dimensional information, the apparatus comprising:

a laser light source providing laser light to an object to be reconstructed in three-dimensional information;

a coordinate reference mechanism unit provided between the laser light source and the object and having a plurality of protrusions reflecting the laser light;

a camera unit outputting an image capturing the coordinate reference mechanism unit and the object simultaneously; and a three-dimensional information processing unit generating three-dimensional information of the object by identifying a projection plane formed by the laser light and using the projection plane, considering a relationship between a plurality of actual protrusion reflection points at which the laser light is reflected by the plurality of protrusions respectively and a plurality of protrusion reflection points displayed in the image, wherein the coordinate reference mechanism unit includes a base plate on which the plurality of protrusions are fixed, and a fixing arm connecting the laser light source and the base plate to each other.

2. The apparatus of claim 1, wherein the coordinate reference mechanism unit includes:

a first protrusions positioned in an origin;

a second protrusions spaced a predetermined distance from the first protrusions and positioned in X-axis direction; and a third protrusions spaced the predetermined distance from the first protrusions and positioned in Y-axis direction.

3. The apparatus of claim 1, wherein the three-dimensional information processing unit identifies a relationship information between the plurality of actual protrusion reflection points based on positions and arrangements of the plurality of protrusion reflection points and the plurality of protrusion reflection points displayed in the image.

4. The apparatus of claim 3, wherein the three-dimensional information processing unit computes the relationship information including a rotation matrix and a translation vector between a coordinate value of the plurality of actual protrusion reflection points and a coordinate value of the plurality of protrusion reflection points displayed in the image.

5. The apparatus of claim 4, wherein the three-dimensional information processing unit computes the projection plane based on the relationship information.

6. The apparatus of claim 1, wherein the three-dimensional information processing unit transforms an intersection point between the projection plane actually formed on the object and a projection point actually projected on the object from an origin of a camera coordinate system through a point of the object displayed in the image, into at least one three-dimensional coordinate point, and combines the at least one three-dimensional coordinate point to generate the three-dimensional information of the object.

7. The apparatus of claim 1, wherein the camera unit includes a plurality of camera devices provided in areas where the object is captured in different directions, to capture different images; and the three-dimensional information processing unit generates the three-dimensional information of the object using the projection plane and the plurality of protrusion reflection points included in the different images.

8. The apparatus of claim 1, wherein the laser light source includes at least one line laser device outputting a line laser.

9. The apparatus of claim 1, wherein the laser light source includes at least one pattern laser device outputting the laser light of a predefined pattern.

10. A method for generating three-dimensional information, the method comprising:

acquiring an image by capturing a coordinate reference mechanism unit provided between a laser light source and an object to be reconstructed in three-dimensional information and having a plurality of protrusions reflecting laser light provided from the laser light source, and the object simultaneously;

identifying coordinates of a plurality of protrusion reflection points at which the laser light is reflected by the plurality of protrusions in the image; and generating the three-dimensional information of the object by identifying a projection plane formed by the laser light and using the projection plane, considering a relationship between the plurality of protrusion reflection points in the image and a plurality of actual protrusion reflection points actually reflected by the plurality of protrusions, wherein the coordinate reference mechanism unit includes a base plate on which the plurality of protrusions are fixed, and a fixing arm connecting the laser light source and the base plate to each other.

11. The method of claim 10, wherein the generating the three-dimensional information of the object includes identifying a relationship between the plurality of protrusion reflection points in the image and the plurality of actual protrusion reflection points.

12. The method of claim 11, wherein the generating the three-dimensional information of the object includes computing the projection plane formed by the laser light based on the relationship information.

13. The method of claim 11, wherein the identifying the relationship information includes identifying the relationship information including a rotation matrix and a translation vector between a coordinate value of the plurality of actual protrusion reflection points and a coordinate value of the plurality of protrusion reflection points displayed in the image.

14. The method of claim 11, wherein the generating the three-dimensional information of the object includes transforming an intersection point between the projection plane and a projection point actually projected on the object from an origin of a camera coordinate system through a point of the object displayed in the image, into at least one three-dimensional coordinate point.

15. The method of claim 10, wherein the acquiring the image by capturing the object includes identifying different images captured from cameras provided in different directions.

16. The method of claim 10, wherein the laser light provided from the light source is at least one line laser light.

17. The method of claim 10, wherein the laser light provided from the light source is laser light of a predefined pattern.

* * * * *